US011196546B2

(12) United States Patent
Anderson et al.

(10) Patent No.: US 11,196,546 B2
(45) Date of Patent: *Dec. 7, 2021

(54) PASSIVE DECRYPTION OF ENCRYPTED TRAFFIC TO GENERATE MORE ACCURATE MACHINE LEARNING TRAINING DATA

(71) Applicant: Cisco Technology, Inc., San Jose, CA (US)

(72) Inventors: Blake Harrell Anderson, San Jose, CA (US); Andrew Chi, Chapel Hill, NC (US); David McGrew, Poolesville, MD (US); Scott William Dunlop, Des Moines, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,373

(22) Filed: Dec. 3, 2019

(65) Prior Publication Data
US 2020/0106604 A1 Apr. 2, 2020

Related U.S. Application Data

(63) Continuation of application No. 15/692,288, filed on Aug. 31, 2017, now Pat. No. 10,536,268.

(51) Int. Cl.
*H04L 29/06* (2006.01)
*H04W 72/04* (2009.01)
(Continued)

(52) U.S. Cl.
CPC .......... *H04L 9/0822* (2013.01); *G06N 5/025* (2013.01); *H04L 9/0894* (2013.01);
(Continued)

(58) Field of Classification Search
CPC ........ G06N 5/025; G06N 20/00; G06F 21/53; G06F 21/566; H04L 63/1458;
(Continued)

(56) References Cited

U.S. PATENT DOCUMENTS 7,853,795 B2    12/2010   Dick et al.
7,992,200 B2    8/2011    Kuehr-McLaren et al.
(Continued)

FOREIGN PATENT DOCUMENTS

JP        2017102559 A     6/2017

OTHER PUBLICATIONS

Anderson, et al., Deciphering Malware's Use of TLS (without Decryption), arXiv preprint arXiv:1607.01639, 2016, 15 pages.
(Continued)

*Primary Examiner* — Michael Simitoski
(74) *Attorney, Agent, or Firm* — Behmke Innovation Group LLC; James M. Behmke; Jonathon P. Western

(57) ABSTRACT

In one embodiment, an apparatus captures a memory dump of a device in a sandbox environment executing a malware sample. The apparatus identifies a cryptographic key based on a particular data structure in the captured memory dump. The apparatus uses the identified cryptographic key to decrypt encrypted traffic sent by the device. The apparatus labels at least a portion of the decrypted traffic sent by the device as benign. The apparatus trains a machine learning-based traffic classifier based on the at least a portion of the decrypted traffic sent by the device and labeled as benign.

20 Claims, 11 Drawing Sheets

(51) Int. Cl.
*H04L 9/08* (2006.01)
*G06N 5/02* (2006.01)

(52) U.S. Cl.
CPC ...... *H04L 63/0428* (2013.01); *H04L 63/1416* (2013.01); *H04L 63/1441* (2013.01); *H04L 63/1458* (2013.01); *H04W 72/0426* (2013.01)

(58) Field of Classification Search
CPC . H04L 63/1408; H04L 9/0822; H04L 9/0894; H04W 12/00; H04W 72/0426
See application file for complete search history.

(56) References Cited

U.S. PATENT DOCUMENTS

| | | | |
|---|---|---|---|
| 8,578,486 B2* | 11/2013 | Lifliand | H04L 63/30 726/22 |
| 9,176,838 B2 | 11/2015 | Li et al. | |
| 9,355,247 B1* | 5/2016 | Thioux | G06F 9/45558 |
| 9,892,256 B1* | 2/2018 | Lango | G06F 21/53 |
| 2017/0201810 A1* | 7/2017 | Anderson | H04Q 9/00 |
| 2017/0279621 A1* | 9/2017 | Yamane | H04L 63/0272 |
| 2017/0324758 A1* | 11/2017 | Hart | H04L 63/1416 |
| 2017/0364794 A1* | 12/2017 | Mahkonen | H04L 43/10 |
| 2018/0097835 A1* | 4/2018 | McGrew | H04L 61/1511 |
| 2018/0103056 A1* | 4/2018 | Kohout | H04L 63/0428 |
| 2018/0114020 A1* | 4/2018 | Hirschberg | G06F 21/566 |
| 2018/0124085 A1* | 5/2018 | Frayman | H04L 63/0428 |
| 2018/0139214 A1* | 5/2018 | Anderson | H04L 63/1408 |
| 2018/0152467 A1* | 5/2018 | Anderson | H04L 63/1425 |
| 2018/0176240 A1* | 6/2018 | Kopp | H04L 63/145 |
| 2018/0276397 A1* | 9/2018 | Hoffman | H04N 1/4433 |
| 2020/0280584 A1* | 9/2020 | Zhao | H04L 29/06 |

OTHER PUBLICATIONS

Anderson, et al., "Machine Learning for Encrypted Malware Traffic Classification: Accounting for Noisy Labels and Non-Stationarity", KDD '17, Proceedings of the 23rd ACM SIGKDD International Conference on Knowledge Discovery and Data Mining, pp. 1723-1732, Aug. 2017, Halifax, NS, Canada.

Begleiter, et al., "On Prediction Using Variable Order Markov Models", Journal of Artificial Intelligence Research 22, AI Access Foundation, Dec. 2004, 385-421.

Dierks, et al., "The Transport Layer Security (TLS) Protocol—Veresion 1.2", IETF Network Working Group, Request for Comments 5246, The IETF Trust, Aug. 2008, 104 pages.

Halderman, et al., "Lest We Remember: Cold Boot Attacks on Encryption Keys", 17th USENIX Security Symposium, 2009, pp. 45-60, USENIX Association.

Halderman, et al., "Lest We Remember: Cold-Boot Attacks on Encryption Keys", Communications of the ACM, vol. 52, No. 5, May 2009, 8 pages.

Kambic, Jake, "Cunning with CNG: Soliciting Secrets from Schannel", Blackhat USA, July-Aug. 2016, 52 pages, Mandalay Bay, Las Vegas, Nevada.

Kambic, Jake., "Extracting CNG TLS/SSL Artifacts From LSASS Memory", https://media.defcon.org/DEF%20CON%2024%20presentations/DEFCON-24-Jkambic-Cunning-With-Cng-Soliciting-Secrets-From-Schannel-WP.pdf, 2016, 115 pages, Defcon.org.

Ligh, et al., "The Art of Memory Forensics: Detecting Malware and Threats in Windows®, Linus®, and MAC® Memory", 2014, Wiley Publishing, Indianapolis, Indiana.

Lindorfer, et al., "Detecting Environment-Sensitive Malware", RAID '11, Proceedings of the 14th International Conference on Recent Advances in Intrusion Detection, Sep. 2011, pp. 338-257, Menlo Park, CA.

Maurer, Ueli M., "A Universal Statistical Test for Random Bit Generators", Journal of Cryptology, vol. 5, No. 2, 1992, pp. 89-105.

Neyman, et al., "On the Problem of the Most Efficient Tests of Statistical Hypotheses", Philosophical Transactions of the Royal Society of London, 1933, pp. 289-337.

Salowey, et al., "Transport Layer Security (TLS) Session Resumption Without Server-Side State", IETF Network Working Group, Request for Comments 5077, The IETF Trust, Jan. 2008, 20 pages.

Taubmann, et al., "TLSkex: Harnessing Virtual Machine Introspection for Decrypting TLS Communication", Digital Investigation 16 (2016): S114-S123.

* cited by examiner

600

| 03 | 03 | 00 | 00 | 00 | 00 | 00 | 00 | 00 | 00 | 00 | 00 | 00 | 00 | 00 | 00 |
|----|----|----|----|----|----|----|----|----|----|----|----|----|----|----|----|
| 30 | 00 | 00 | 00 | 00 | 00 | 00 | 00 | 00 | 00 | 00 | 00 | 00 | 00 | 00 | 00 |
| E3 | 74 | DF | E2 | C9 | 71 | AF | 41 | 2C | 0B | E6 | AF | 70 | 32 | 6E | C3 |
| A3 | 2C | A0 | E6 | 3A | 7A | FF | 0E | F3 | 70 | A2 | 8A | 88 | 52 | B2 | 2D |
| D1 | B3 | F6 | F2 | 20 | 00 | 00 | 00 | CD | 31 | 58 | BF | DF | 97 | B0 | F8 |
| C0 | 86 | BA | 48 | 47 | 93 | B0 | A5 | BA | C1 | 5B | 4B | 35 | 37 | 7F | 98 |

| 03 | 03 | 00 | 00 | 00 | 1D | 00 | 04 | 08 | 30 | 00 | 00 | 77 | F1 | 26 | 9D |
|----|----|----|----|----|----|----|----|----|----|----|----|----|----|----|----|
| 7C | FD | 06 | EB | 68 | 9B | FE | 60 | 22 | 80 | A0 | D6 | A7 | 23 | 3F | CD |
| AF | CA | 00 | F2 | 21 | 4D | 50 | 5B | E4 | 15 | 24 | AA | 70 | 87 | 9E | CF |
| 0A | 51 | F2 | 74 | B9 | 9A | B9 | 23 | E4 | 45 | 6A | 60 | 20 | 00 | 00 | 00 |
| 59 | 56 | EF | 85 | 60 | C6 | 1B | 0A | 30 | 54 | B1 | 42 | 95 | F1 | 0D | D6 |
| 72 | 5C | 62 | 42 | D9 | AD | CA | B5 | 77 | 42 | 44 | 1C | 7B | 47 | 5B | 45 |

| | | | | | | | | | | | | | | | |
|---|---|---|---|---|---|---|---|---|---|---|---|---|---|---|---|
| 50 | 00 | 00 | 00 | 35 | 6C | 73 | 73 | 03 | 03 | 00 | 00 | 00 | 00 | 00 | 00 |
| 10 | 14 | B8 | 2B | F8 | 7F | 00 | 00 | 01 | 00 | 00 | 00 | AF | 2B | 44 | 5A |
| 32 | FE | 83 | 20 | D4 | C8 | 05 | 6B | 7D | 13 | 48 | FD | 41 | 5E | C8 | E8 |
| 31 | 2E | 20 | A4 | E6 | E7 | 91 | 90 | 92 | 0A | B8 | EB | 50 | BF | DF | 72 |
| 55 | 98 | C6 | E8 | F5 | B6 | 6C | BB | 76 | FF | 22 | 8F | 00 | 00 | 00 | 00 |

| address | | | | | | | | | | | | | | | | | | | | | ASCII |
|---|---|---|---|---|---|---|---|---|---|---|---|---|---|---|---|---|---|---|---|---|---|
| 030d3b64 | 00 | 00 | 00 | 00 | 00 | F0 | 44 | DF | 57 | C9 | 01 | 00 | 00 | 00 | 00 | 00 | 00 | 00 | 00 | 00 | .....D.W........ |
| 030d3b78 | 00 | 11 | 00 | 00 | 00 | 11 | 00 | 00 | 7C | 42 | DF | 57 | C9 | 01 | 00 | 00 | 30 | 6D | A1 | D5 | ........\|B.W...0. |
| 030d3b8c | 00 | 7A | FC | 46 | 1D | B5 | AD | EA | 59 | CC | AD | 27 | 78 | 41 | 2F | E0 | 12 | 6D | A1 | D5 | .zF....Y..'xA/.m.. |
| 030d3ba0 | 52 | 60 | 45 | FB | 2A | 08 | 67 | BB | 20 | 38 | 94 | 00 | 00 | 00 | BA | D2 | EE | 2E | 9D | | R'E.*.g. 88.rhT... |
| 030d3bb4 | DD | 83 | B9 | C2 | FB | 5B | 53 | 78 | 41 | 00 | 00 | 00 | 00 | 00 | 00 | 00 | 00 | 00 | 00 | 00 | .....[SxA....... |
| 030d3bc8 | 00 | B0 | 48 | DF | 57 | C9 | 01 | 00 | 00 | 00 | 00 | 00 | 00 | 00 | 00 | 00 | 01 | 00 | 00 | 00 | ..H.W........... |

630

640

| | | | | | | | | | | | | | | | | | |
|---|---|---|---|---|---|---|---|---|---|---|---|---|---|---|---|---|---|
| 00004b618 | 00 | 00 | 00 | 00 | 00 | 00 | 00 | 00 | 00 | 00 | 00 | 00 | 00 | 00 | 00 | 00 | ................ |
| 00004b62c | 48 | 27 | F7 | 00 | 00 | 00 | 00 | 00 | 00 | 00 | 00 | 00 | 00 | 00 | 00 | 00 | H'.............. |
| 00004b640 | 00 | 00 | 00 | 00 | 00 | 11 | 00 | 00 | 00 | 00 | 00 | 00 | 00 | 11 | 00 | 00 | ................ |
| 00004b654 | 30 | 00 | 00 | 00 | 00 | 00 | 00 | 00 | 67 | 7A | A9 | 8A | 70 | 24 | FC | 32 | 0......gz..2p$.2 |
| 00004b668 | 56 | 37 | F1 | 46 | 3B | 38 | FE | B3 | 33 | F7 | B6 | 1E | F7 | B8 | 1B | 22 | V7.F:8..3....." |
| 00004b67c | 4A | 94 | B6 | C6 | D8 | 4F | 30 | 87 | 57 | 90 | 6C | 27 | 89 | AE | EF | 9E | J....O0.W.l'.... |
| 00004b690 | 00 | 00 | 00 | 00 | 00 | 00 | 00 | 00 | 00 | 00 | 00 | 00 | 00 | 00 | 00 | 00 | ................ |

FIG. 6E

PASSIVE DECRYPTION OF ENCRYPTED TRAFFIC TO GENERATE MORE ACCURATE MACHINE LEARNING TRAINING DATA

RELATED APPLICATION

The present application is a continuation application of U.S. patent application Ser. No. 15/692,288, filed on Aug. 31, 2017, entitled PASSIVE DECRYPTION OF ENCRYPTED TRAFFIC TO GENERATE MORE ACCURATE MACHINE LEARNING TRAINING DATA, by Anderson, et al., the contents of which are incorporated herein by reference.

TECHNICAL FIELD

The present disclosure relates generally to computer networks, and, more particularly, to passive decryption of encrypted traffic to generate more accurate machine learning training data.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6E illustrate examples of memory dumps in which a cryptographic key is located;

DESCRIPTION OF EXAMPLE EMBODIMENTS

Overview

Figure 1A:
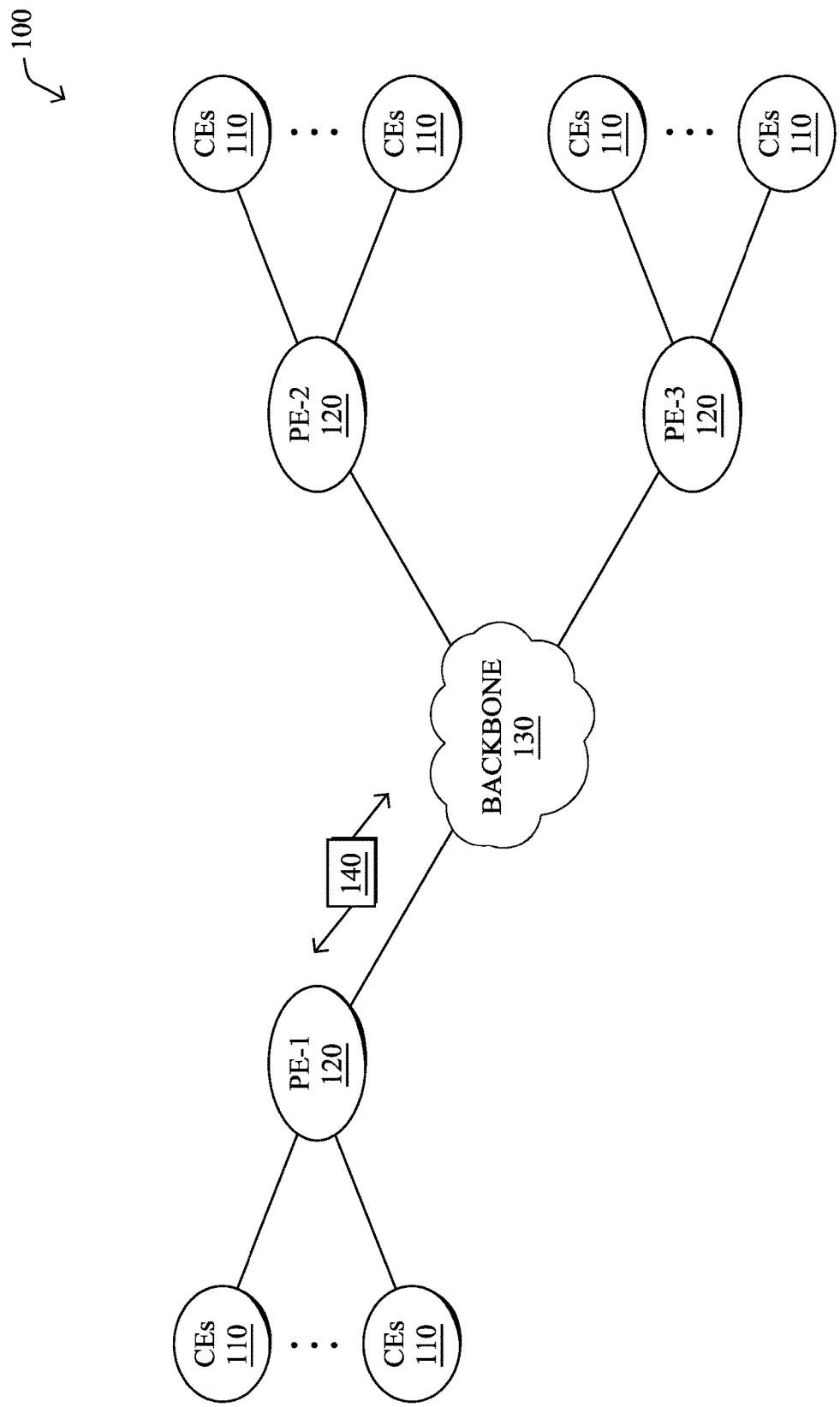
FIGS. 1A-1B illustrate an example communication network.

According to one or more embodiments of the disclosure, an apparatus captures a memory dump of a device in a sandbox environment executing a malware sample. The apparatus identifies a cryptographic key based on a particular data structure in the captured memory dump. The apparatus uses the identified cryptographic key to decrypt encrypted traffic sent by the device. The apparatus labels at least a portion of the decrypted traffic sent by the device as benign. The apparatus trains a machine learning-based traffic classifier based on the at least a portion of the decrypted traffic sent by the device and labeled as benign.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
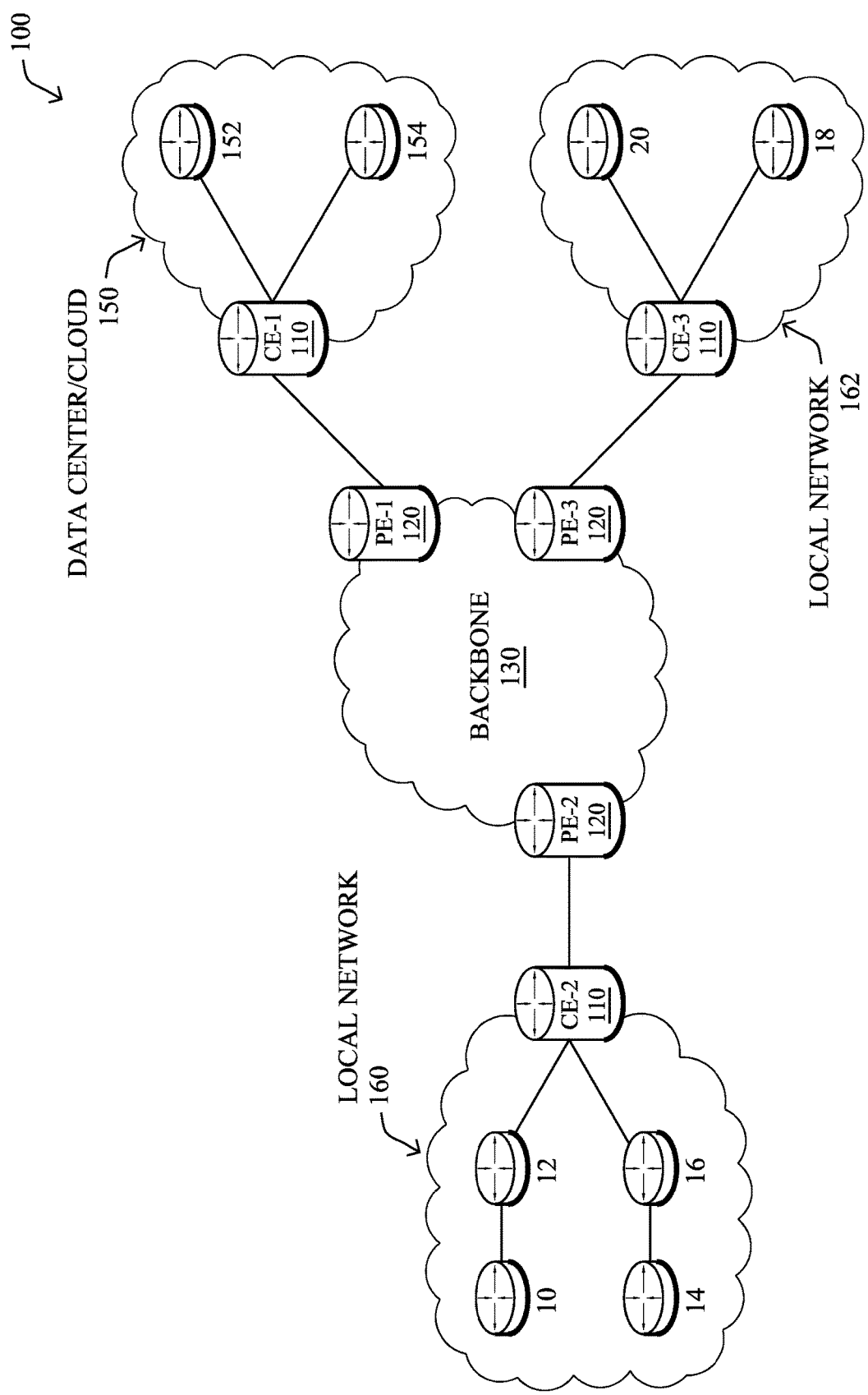

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
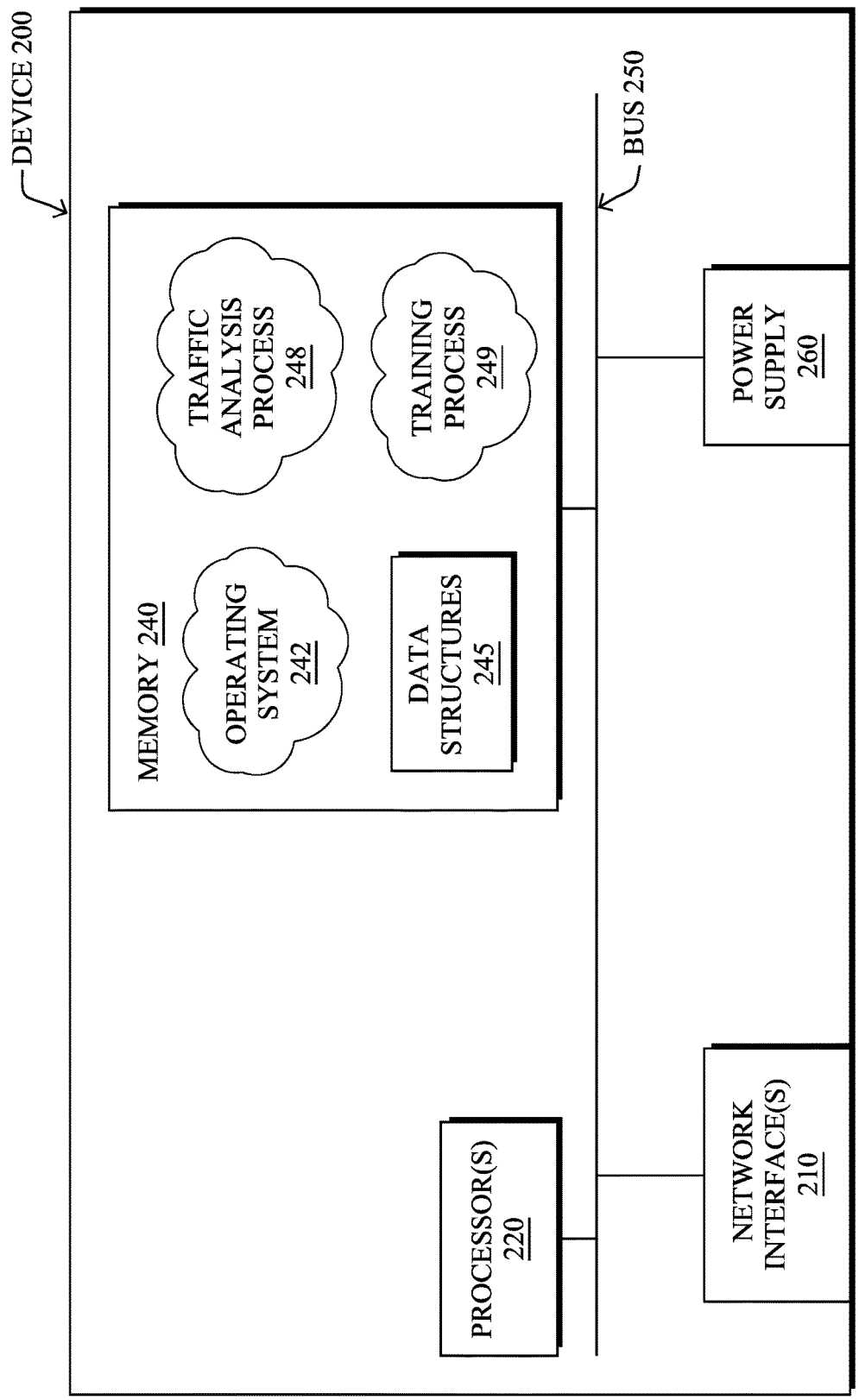
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
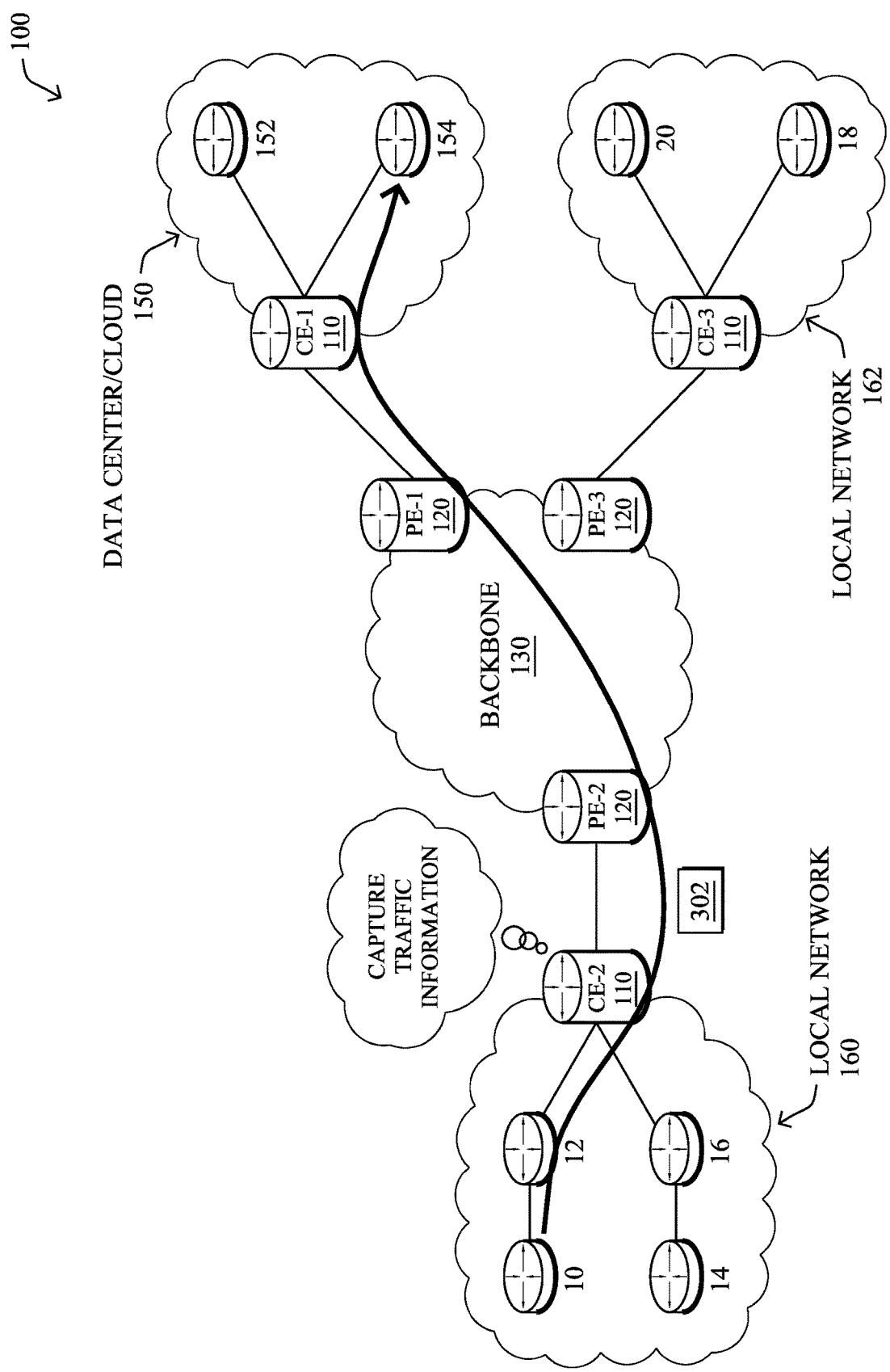
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, machine learning-based traffic analysis presents a promising way to distinguish between benign and malicious network traffic, even in the case where the traffic under scrutiny is encrypted. To train such an analyzer, training data may be generated by observing the network traffic generated by one or more malware samples in a sandbox environment. However, testing has revealed that many forms of malware often leverage other applications on the resident device, e.g., a web browser, to make their malicious encrypted connections. These applications can also generate benign traffic outside of their use by the malware, thus adding a level of label noise to the training set that would result in suboptimal models. On the other hand, filtering based on the data available, e.g., the value present in the server_name extension of the traffic, is not always reliable due to technical reasons and attacks related to domain fronting.

Passive Decryption of Encrypted Traffic to Generate More Accurate Machine Learning Training Data The techniques herein introduce a mechanism that automatically extracts the TLS cryptographic key from memory, and then uses that cryptographic key to decrypt an encrypted traffic session, such as those formed in sandbox environment. In turn, the decrypted data can be used to identify the correct class label for the traffic (e.g., benign vs. malicious traffic examples), and use the data features extracted from the original, encrypted session to train the classifier. In some aspects, regular expressions and heuristics can be used to extract the encryption key from the memory of a malware-infected device in a sandbox/controlled lab environment, and then use that cryptographic key to decrypt the session. Using the plaintext data from the decrypted traffic, a more accurate set of training labels can be achieved, to train a machine learning-based traffic classifier that assesses encrypted network traffic.

Specifically, according to one or more embodiments of the disclosure as described in detail below, an apparatus captures a memory dump of a device in a sandbox environment executing a malware sample. The apparatus identifies a cryptographic key based on a particular data structure in the captured memory dump. The apparatus uses the identified cryptographic key to decrypt encrypted traffic sent by the device. The apparatus labels at least a portion of the decrypted traffic sent by the device as benign. The apparatus trains a machine learning-based traffic classifier based on the at least a portion of the decrypted traffic sent by the device and labeled as benign.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein, e.g., in conjunction with training process 249.

Operationally, the techniques herein are based on the following observations from preliminary testing:

1. Malware tends to use established TLS libraries, especially ones available by default on the targeted platform.

2. For all TLS libraries that were tested, each 48-byte cryptographic key is available in RAM for the entire duration of its TLS connection. Some are available longer.

3. In most TLS libraries that were tested (all except NSS), the cryptographic key is nested in a predictable data structure.

4. Otherwise (for NSS), the cryptographic key is stored in a 48-byte standalone buffer that is allocated somewhere on the heap. With a high probability, this results in a 48-byte buffer of high entropy that is surrounded by lower entropy bytes.

The primary libraries tested to develop the techniques herein were OpenSSL, Google's BoringSSL, Microsoft's Secure Channel (Schannel), and Mozilla's Network Security Services (NSS). Source code of wolfSSL, Apple Secure Transport, and GnuTLS were assessed, to check for consistency with patterns in the other implementations.

Figure 4:
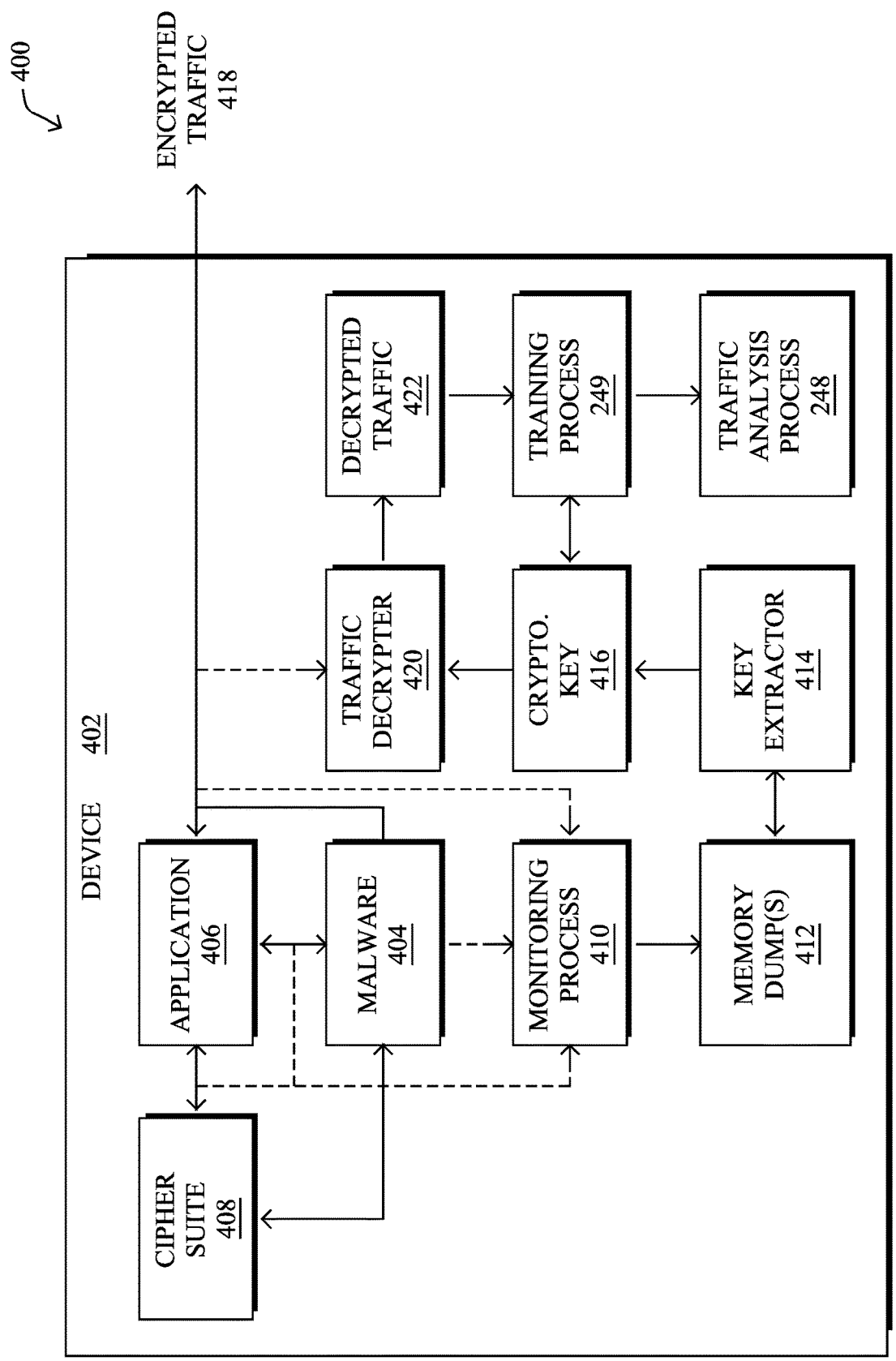
FIG. 4 illustrates an example architecture for training a machine learning-based traffic analyzer.

FIG. 4 illustrates an example architecture 400 for training a machine learning-based traffic analyzer (e.g., traffic analysis process 248), according to various embodiments. In general, architecture 400 may be implemented on a device 402, such as a device in a sandbox environment. Alternatively, architecture 400 may be implemented in a distributed manner, such as by collecting training data on one device and training the traffic analyzer on another device, in which case, the devices working in conjunction with one another may also be viewed as a single device/apparatus. Further, the components of architecture 400 may be implemented in a distributed manner or implemented as its own stand-alone service, either as part of the local network under observation or as a remote service. In addition, the functionalities of the components of architecture 400 may be combined, omitted, or implemented as part of other processes, as desired.

As shown, device 402 may be configured to execute an application 406, such as a web browser or other application that may use a cipher suite 408 to send and/or receive encrypted traffic 418 via a network. Device 402 may also be infected with a malware sample 404 that, as noted above, may leverage application 406 to send malicious traffic as part of encrypted traffic 418. In various embodiments, architecture 400 may also have three main functions: 1.) key extraction, 2.) decryption, and 3.) generating intelligence from the decrypted traffic.

With respect to key extraction, architecture 400 may include a monitoring process 410 that monitors the operations of malware 404, application 406, and/or cipher suite 408, such as during an encrypted traffic session. In a typical encrypted connection, the client device 402 generates the cryptographic key when device 402 receives the server_key_exchange. Then, device 402 will derive the encryption keys and initialization vectors (IVs) from the cryptographic key, based on cipher suite 408, and uses this key material to encrypt/decrypt the traffic 418. Once device 402 has the key material, it is possible to zeroize the cryptographic key, but this rarely occurs.

Once the encrypted connection has ended, many clients still keep the cryptographic key in memory, to facilitate session resumption. Thus, to obtain a memory image that will include the cryptographic key with high probability, monitoring process 410 may generate memory dump(s) 412 at strategic points during the encrypted connection and/a memory dump 412 when the sandbox run is complete.

Figure 5:
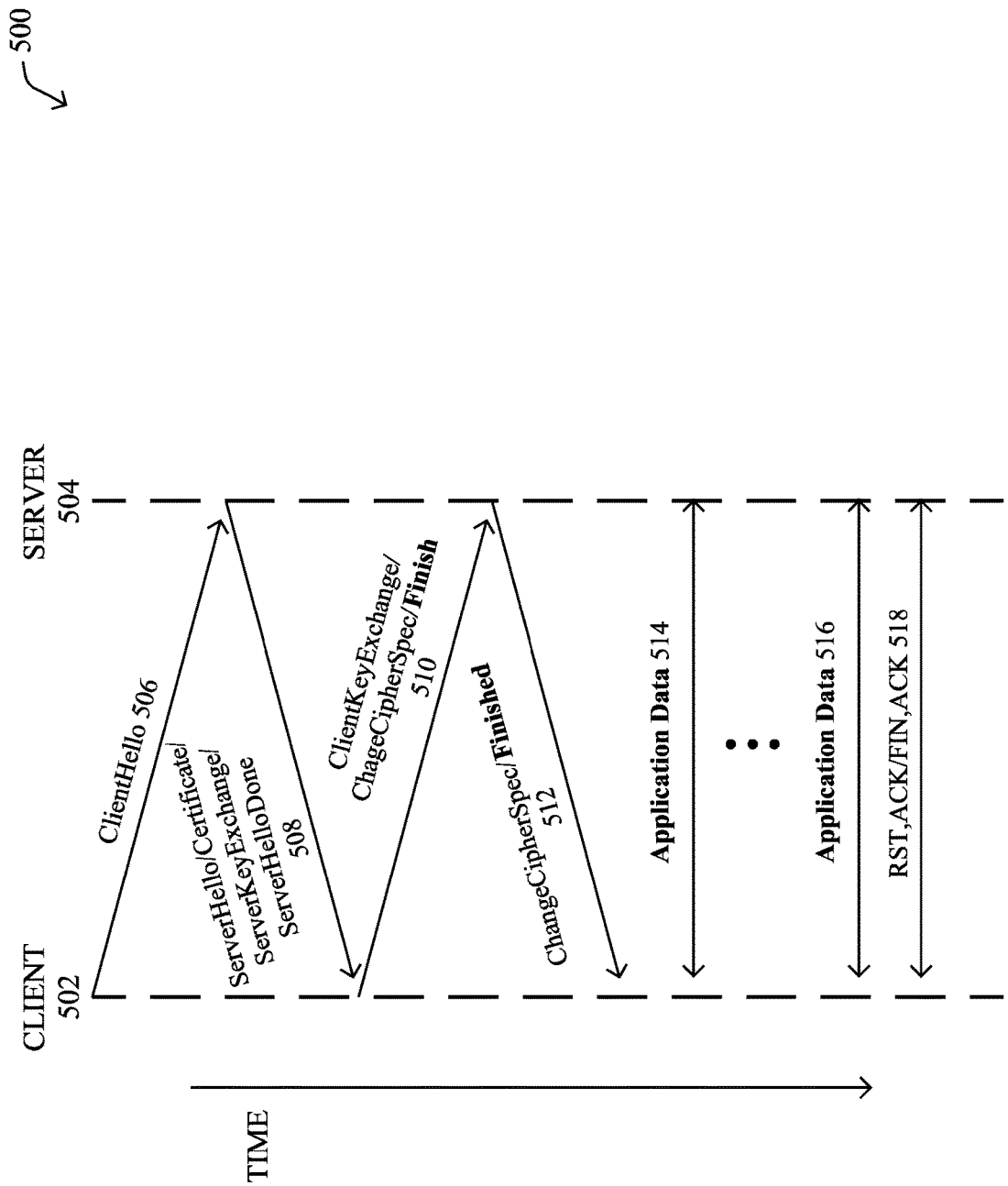
FIG. 5 illustrates an example session for encrypted network traffic.

Referring briefly to FIG. 5, an example session 500 for encrypted network traffic is shown. In a typical encrypted traffic session, such as a TLS session, a client 502 may initiate a session with a remote server 504 by performing a hello-messaging exchange. In particular, client 502 may send a ClientHello message 506 to server 504. In turn, server 504 may send a response 508 that includes, e.g., a ServerHello acknowledgement and a ServerHelloDone indication that the hello-message phase of the handshake is done, as specified in the Internet Engineering Task Force (IETF) Request for Comments (RFC) 5246 entitled, "The Transport Layer Security (TLS) Protocol Version 1.2," by Dierks et al. This handshaking is performed to establish the protocol version, session identifier, cipher suite in use, and compression method for the encrypted session. In addition, server 504 may include its certificate for validation by client 502. In turn, client 502 and server 504 may exchange messages 510 and 512, to exchange encryption keys for use during session 500. After the key exchange, client 502 and 504 may use the keys to encrypt and decrypt application data messages 514-516. At some point in time, the session may then be reset, finished, or the like, via messaging 518 sent by client 502 back to server 504.

Referring again to FIG. 4, the availability of the TLS keys during session 500 are described herein with respect to two factors: 1.) the time interval over which the keys are in memory, and 2.) which process(es) contain the keys. This information can be used to intelligently capture memory snapshots/dumps 412 (e.g., by monitoring process 410). As specified by RFC 5246, the cryptographic key is considered a primary component of the "state" of a TLS session, such as session 500 in FIG. 5. The cryptographic key is required during the handshake, to derive the directional key material such as client/server write keys and client/server initialization vectors. As such, knowledge of the TLS cryptographic key is sufficient to decrypt a captured TLS session.

In various embodiments, monitoring process 410 may generate memory dump(s) 412 based on any or all of the following triggering conditions:
When the client's change_cipher_spec message is observed in the network traffic;
When the client's $2^{nd}$ or $3^{rd}$ socket.send( ) call to the same TLS 5-tuple is observed by monitoring process 410;
Modifications of the above rule for other relevant, observable API calls;
Pre-determined time intervals based on previous sandbox runs, e.g.:
Based on all previous runs, select the top-k offsets in seconds that will produce the most cryptographic keys
Based on a prior run of the target sample, select the top-k offsets in seconds that will produce the most cryptographic keys All of the above triggering conditions can generate either a full memory dump or a process-specific memory dump.

In terms of the process that contains the keys, the main application process (e.g., of application 406) was observed in most cases to perform the cryptographic operations and, therefore, contains the keys. In the case of Microsoft Secure Channel (Schannel), however, a single process, lsass.exe was found to contain all of the keys and perform all of the cryptographic operations on behalf of the process using the Schannel API. Accordingly, in many embodiments, monitoring process 410 may take process-specific snapshots/memory dumps(s) 412 near the end of the TLS handshake, e.g., just before the application data records are sent. If this is not possible, some keys may, nevertheless, persist past the TCP connection close and can be captured then. On Windows-based devices, further embodiments provide for monitoring process 410 capturing memory snapshots/dumps 412 for both the main process, as well as for lsass.exe.

In various embodiments, architecture 400 may also include a cryptographic key extractor 414 configured to extract the encryption key 416 from memory dump(s) 412 using a set of regular expressions or entropy heuristics. In the specific case of TLS, such an encryption key 416 may also be referred to as a "master secret." Preliminary testing has shown that the regular expression approach disclosed herein works for OpenSSL, BoringSSL, and Schannel. Assuming that the cryptographic key is available and contained within a predictable data structure, the appropriate regular expression can be learned automatically. In the case of NSS, however, the cryptographic key is allocated in memory independently, meaning that it is not directly surrounded by a predicable data structure. In such cases, cryptographic key extractor 414 may apply a windowed entropy heuristic that identifies 48 high entropy bytes with some number of low entropy bytes on either side. The cryptographic key can also be identified using more advanced techniques, e.g., the sequential probability ratio test or Neyman-Pearson lemma, in further embodiments.

Several assumptions can be made, with respect to extracting the cryptographic key from a memory dump. First, it can be assumed for purposes of illustration that a given memory dump is either a dump of a single process or, alternatively, from the entire device. Second, it can be assumed that the process associated with the dump uses an encryption/TLS library that is known or guessable. As noted, in most TLS libraries, the cryptographic key is nested in a predictable data structure. The following subsections describe those data structures for several of the most commonly used TLS libraries, along with simple regular expressions for extracting cryptographic keys.

OpenSSL:

In some embodiments, cryptographic key extractor 414 may be configured to return a list of candidate 48-byte TLS cryptographic keys 416 from the memory dump 412 of application 406, if OpenSSL is used. To do so, cryptographic key extractor 414 may leverage the fact that the cryptographic key is stored in the following ssl_session_st struct reference, also known as SSL_CTX, that appears in ssl/ssl.h as follows:

```
#define SSL_MAX_KEY_ARG_LENGTH          8
#define SSL_MAX_MASTER_KEY_LENGTH       48
#define SSL_MAX_SSL_SESSION_ID_LENGTH   32
#define SSL_MAX_SID_CTX_LENGTH          32
...
struct ssl_session_st {
int ssl_version;           /* what ssl version session info is being
* kept in here? */
/* only really used in SSLv2 */
unsigned int key_arg_length;
unsigned char key_arg[SSL_MAX_KEY_ARG_LENGTH];
int master_key_length;
unsigned char master_key[SSL_MAX_MASTER_KEY_LENGTH];
/* session_id - valid? */
unsigned int session_id_length;
unsigned char session_id[SSL_MAX_SSL_SESSION_ID_LENGTH];
/*
* this is used to determine whether the session is being reused in the
* appropriate context. It is up to the application to set this, via
* SSL_new
*/
unsigned int sid_ctx_length;
unsigned char sid_ctx[SSL_MAX_SID_CTX_LENGTH];
...
  For reference, the possible SSL/TLS version codes in OpenSSL are:
  SSL2_VERSION    = 0x0002   // see ssl/ssl2.h
  SSL3_VERSION    = 0x0300   // see ssl/ssl3.h
  TLS1_VERSION    = 0x0301   // see ssl/tls1.h
  TLS1_1_VERSION  = 0x0302   // see ssl/tls1.h
  TLS1_2_VERSION  = 0x0303   // see ssl/tls1.h
```

Note that the version code is stored in an integer which, on most CPUs is little-endian, so TLS 1.0 is represented in memory for OpenSSL by the sequence of bytes 0x01030000. In addition, session_id_length may be zero, indicating that the session should not be cached, according to the function ssl_update_cache( ) in ssl/ssl_lib.c. An example 600 of the data structure in memory is illustrated in FIG. 6A, where the 48-byte cryptographic key is highlighted. In various embodiments, the following regular expression will yield all OpenSSL cryptographic keys and can be used by cryptographic key extractor 414 to extract cryptographic key 416 from memory dump(s) 412:

(\x02\x00|[\x00-x03]\x03)\x00\x00
(?=.{4}.{8}\x30\x00\x00\x00(.{48})[\x00-\x20]
\x00\x00\x00)

In some implementations, most regular expression libraries require the use of a lookahead (?= . . . ), to enable overlapping matches. Also, the key_arg_length field may be restricted, in some cases, which may eliminate some false positives.

BoringSSL

BoringSSL is Google's streamlined version of OpenSSL and has been found to have a similar data layout for ssl_session_st in ssl/ssl.h as above:

```
#define SSL_MAX_SSL_SESSION_ID_LENGTH 32
#define SSL_MAX_SID_CTX_LENGTH 32
#define SSL_MAX_MASTER_KEY_LENGTH 48
struct ssl_session_st { CRYPTO_refcount_t references;
/* what ssl version session info is being kept in here? */
int ssl_version;
/* group_id is the ID of the ECDH group used to establish this
* session or zero if not applicable or unknown. */
uint16_t group_id;
/* peer_signature_algorithm is the signature algorithm used to
* authenticate the peer, or zero if not applicable or unknown. */
uint16_t peer_signature_algorithm;
/* master_key, in TLS 1.2 and below, is the cryptographic key associated
* with the session. In TLS 1.3 and up, it is the resumption secret. */
int master_key_length;
uint8_t master_key[SSL_MAX_MASTER_KEY_LENGTH];
/* session_id - valid? */
unsigned int session_id_length;
uint8_t session_id[SSL_MAX_SSL_SESSION_ID_LENGTH];
/* this is used to determine whether the session is being reused in
* the appropriate context. It is up to the application to set this,
* via SSL_new */
uint8_t sid_ctx_length;
uint8_t sid_ctx[SSL_MAX_SID_CTX_LENGTH];
char *psk_identity;
...
```

FIG. 6B illustrates an example 610 of the captured data structure in which BoringSSL stores the cryptographic key, which is highlighted. The refcount is also omitted in this example. Of note is that the version code and session ID ranges are unchanged from OpenSSL, so importing those yields the following regular expression for BoringSSL cryptographic keys:

(\x02\x00|[\x00-\x03]\x03)\x00\x00 (?=. {2}.{2}\x30\x00\x00x00(. {48}) [\x00-\x20] \x00\x00\x00)

According to some embodiments, this regular expression can be used by cryptographic key extractor 414 to extract cryptographic key 416 from memory dump(s) 412, when BoringSSL is used.

Note also that the regex above does not use two fields, both of which are 16-bit unsigned integers: group_id and peer_signature_algorithm. As a refinement, in further embodiments, constraining these fields might reduce false positives if the standards permit only a small subset of the 216 possibilities for each field. This refinement would be achieved at the cost of keeping the regex up to date with the appropriate IANA registries of groups and signature algorithms.

Schannel:

Microsoft's Secure Channel (Schannel) was introduced in Windows 2000, and provides support to applications wishing to encrypt data payloads with SSL/TLS. Unlike other libraries, Schannel does not run in the address space of the calling process. Instead, all cryptographic functionality is delegated to a single system process named lsass.exe (Local Security Authority Subsystem Service). Thus, in some embodiments, monitoring process 410 may capture a memory dump 412 of the lsass.exe process, when Schannel is used.

From experimentation, the data structure containing the TLS cryptographic key when Schannel is used is summarized below, with the left column representing the size of each field in bytes:

| _SSL_MASTER_SECRET | |
|---|---|
| 4 | cbStructLength |
| 4 | dwMagic ["ssl5"] |
| 4 | dwProtocolVersion |
| 0/4 | dwUnknown1* [alignment?] |
| 4/8 | pCipherSuiteListEntry |
| 4 | bIsClientCache |
| 48 | rgbMasterSecret |
| 4 | dwUnknown2 [reserved?] |

FIG. 6C illustrates an example 630 of the captured data structure in memory with the 48-byte cryptographic key highlighted, when Schannel is used. Note that the ASCII string "ssl5" is in reverse order, as would be the case if the C source code included an unsigned integer that was assigned the literal 0x73736C35 (as written in the source). The regular expression for extracting Schannel cryptographic keys is therefore:

\x35\x6c\x73\x73(?=(\x02\x00|[\x00-\x03]\x03)\x00\x00 (. {4}. {8}. {4})(.{48}))

which can be used by cryptographic key extractor 414, in some embodiments, to extract cryptographic key 416 from memory dump(s) 412 when Schannel is used.

There are a few subtleties that should also be noted. First, the internal encoding of the 4-byte field dwProtocolVersion appears to be little-endian, as both 0x03030000 (TLS 1.2) and 0x01030000 (TLS 1.0) were observed in sample memory dumps during experimentation.

It is unclear how SSLv2 is encoded, but since the observed versions match OpenSSL encodings, OpenSSL encodings can be assumed for the regex. Second, the 64-bit version of the struct can be assumed as follows: a 4-byte dwUnknown1 and an 8-byte pCipherSuiteListEntry. If 32-bit support is required, the regex should be augmented. Also, cbStructLength (so far always 0x50000000) could also be used to potentially help distinguish 32-bit and 64-bit versions. Finally, the field bIsClientCache is most likely a boolean that can take only the values 0 or 1 (so far always 0x01000000). Restricting this field could further reduce false positives.

Network Security Services (NSS)

Mozilla Network Security Services (NSS) is the primary SSL/TLS library used in Mozilla client products, such as Firefox and Thunderbird. Outside of Mozilla, NSS is also used on the server side by Red Hat and the Sun Java Enterprise System, and for other independent applications such as the Opera browser and OpenOffice.org.

At first glance, NSS should not be amenable to a regex key search. The reason is that preliminary experimentation has shown that the TLS cryptographic key is not embedded within a predictable data structure. Instead, it is allocated in a standalone 48-byte buffer, which could be anywhere on the heap. A generic SECItem struct holds a pointer to it, as specified in lib/util/seccomon.h:

```
typedef struct SECItemStr SECItem;
struct SECItemStr { SECItemType type;
unsigned char *data; // e.g., pointer to cryptographic key
unsigned int len;
};
```

The cryptographic key for NSS has no guaranteed context. However, at least one copy of the TLS cryptographic key (i.e., the initial copy) is allocated directly adjacent to the SECItem struct. Thus, the cryptographic key can still be identified by looking to a particular data structure. For example, the NSS code may allocate the SECItem struct immediately prior (in time) to allocating the cryptographic key, and both are relatively small allocations. Thus, with high probability, implementations of malloc will place the cryptographic key immediately adjacent to the SECItem struct. FIGS. 6D-6E illustrate two examples 630-640 of the cryptographic key (highlighted) and surrounding context in the memory dump file. Example 630 in FIG. 6D is taken from Firefox on 64-bit Windows 10, while example 640 in FIG. 6E is from an NSS test client running 64-bit Linux.

For the SECItem struct, the type field has the value 0x113, the pointer is 8 bytes long, and the length field has value 0x30=48. Note that a difference in compilers causes padding to be inserted in the Linux case, but not in the Windows case. Accommodating padding, the regex for NSS is:

\x11\x00\x00\x00(?=(.{8}\x30\x00\x00\x00|. {4}.{8}\x30\x00\x00\x00. {4})(.{48}))

which can be leveraged by cryptographic key extractor 414 to identify the cryptographic key 416 from memory dump(s) 412, in some embodiments, when NSS is used. In practice, this regex has found all NSS cryptographic keys in the tested memory dumps. However, the cryptographic key need not always be allocated next to the struct in which its pointer is located. In another embodiment, a more robust method for handling libraries like this would be to search for the SECItem struct, read the pointer value, and then do a translation from the virtual address to a location in the memory dump.

Other TLS Libraries

While an exhaustive survey of all TLS libraries was not conducted during experimentation, the source codes of three other common libraries were also assessed: Apple Secure Transport, GnuTLS, and wolfSSL. All of these were found to embed the TLS cryptographic key in a data structure, in a manner similar to that of OpenSSL. Thus, further embodiments of cryptographic key extractor 414 provide for the extraction of the cryptographic key 416 for these libraries, as well, by looking to their corresponding data structures in memory dump(s) 412.

Secure Transport is Apple's open source implementation of SSL, TLS, and DTLS, and is deployed widely in the OS X and iOS ecosystems. Its TLS session state data structure can be found in the file libsecurity_ssl/lib/sslContext.h as follows:

```
struct SSLContext
{
...
SSLProtocolVersion negProtocolVersion; /* negotiated */
SSLProtocolVersion clientReqProtocol; /* requested by client */
SSLProtocolVersion minProtocolVersion;
SSLProtocolVersion maxProtocolVersion;
Boolean         isDTLS; /* if this is a Datagram Context */
...
uint8_t         clientRandom[SSL_CLIENT_SRVR_RAND_SIZE];
uint8_t         serverRandom[SSL_CLIENT_SRVR_RAND_SIZE];
SSLBuffer       preMasterSecret;
uint8_t         masterSecret[SSL_MASTER_SECRET_SIZE];
/* running digests of all handshake messages */
SSLBuffer shaState, md5State, sha256State, sha512State;
...
}
```

Accordingly, the 48-byte cryptographic key is embedded in a data structure with predictable components, and a regex could be built for this library, in some implementations.

GnuTLS is a cryptographic library used by a number of popular Linux applications, including GNOME, Exim, Mutt, Wireshark, CUPS, and Emacs. GnuTLS defines its SSL security parameter data structure in the file lib/gnutls_int.h:

```
typedef struct
{
...
cipher_suite_st current_cipher_suite;
opaque master_secret[GNUTLS_MASTER_SIZE];
opaque client_random[GNUTLS_RANDOM_SIZE];
opaque server_random[GNUTLS_RANDOM_SIZE];
opaque session_id[TLS_MAX_SESSION_ID_SIZE];
uint8_t session_id_size;
time_t timestamp;
...
gnutls_certificate_type_t cert_type;
gnutls_protocol_t version; /* moved here */
...
} security_parameters_st;
```

Again, the 48-byte cryptographic key is embedded in a data structure with predictable fields, and is expected to be amenable to identification via regex.

The wolfSSL library, previously CyaSSL, is a lightweight SSL/TLS library actively used in embedded systems, IoT, and industrial automation, among other applications. Its underlying wolfCrypt cryptography library has been FIPS 140-2 validated. Its TLS session state data structure is defined in wolfssl/internal.h:

```
struct WOLFSSL_SESSION {
word32    bornOn;           /* create time in seconds */
word32    timeout;          /* timeout in seconds     */
byte      sessionID[ID_LEN]; /* id for protocol        */
byte      sessionIDSz;
byte      masterSecret[SECRET_LEN]; /* stored secret */
word16    haveEMS;          /* ext cryptographic key flag */
#ifdef SESSION_CERTS
WOLFSSL_X509_CHAIN chain;   /* peer cert chain, static */
#endif
#if defined(SESSION_CERTS)  (defined(WOLFSSL_TLS13) && \
                             defined(HAVE_SESSION_TICKET))
Protocol Version  version;  /* which version was used */
byte      cipherSuite0;     /* first byte, normally 0 */
byte      cipherSuite;      /* 2nd byte, actual suite */
#endif
```

As before, the 48-byte cryptographic key is embedded in a data structure with predictable fields. In this case, depending on compilation flags, the data structure could vary in a number of ways. However, it is still be relatively straightforward to detect this data structure, as the preceding timestamp is always present.

Unknown Libraries

In certain cases, the TLS library may be unknown or it may allocate its keys as standalone buffers on the heap without predictable context, as illustrated by the NSS cryptographic key data structure. Or, in a practical deployment, the regex may contain an implementation bug that causes it to miss certain keys. In these cases, a more general mechanism for detecting keys may be used. The basic idea underlying the following statistical key search mechanism is that with high probability, the TLS cryptographic key will be a 48-byte buffer that is high entropy, surrounded by 8-byte "wing" buffers that are low entropy. In various embodiments, cryptographic key extractor 414 may utilize the following approach:

1. Use a Neyman-Pearson (NP) likelihood ratio test as the primary detector and ordering metric for possible keys.
2. Reduce the number of false positives by filtering out non-random keys by using the multinomial distribution.
3. Reduce the number of false positives further by filtering using a miniature version of the Maurer universal test for random bit generators.

In general, the Neyman-Pearson lemma states that, for a hypothesis test between two simple hypotheses H0: θ=θ0 (e.g., normal memory) and H1: θ=θ1 (e.g., cryptographic key), it can be shown that the following likelihood ratio test is the most powerful test for a given significance level. Given an observation x (e.g., some 48-byte buffer), H0 may be rejected in favor of H1 when:

$$\Lambda(x) = \frac{L(x \mid \theta_0)}{L(x \mid \theta_1)} \leq \eta.$$

The test's significance level, a, is given by the probability α=P (Λ(X)≤f̃|H0).

Figure 7:
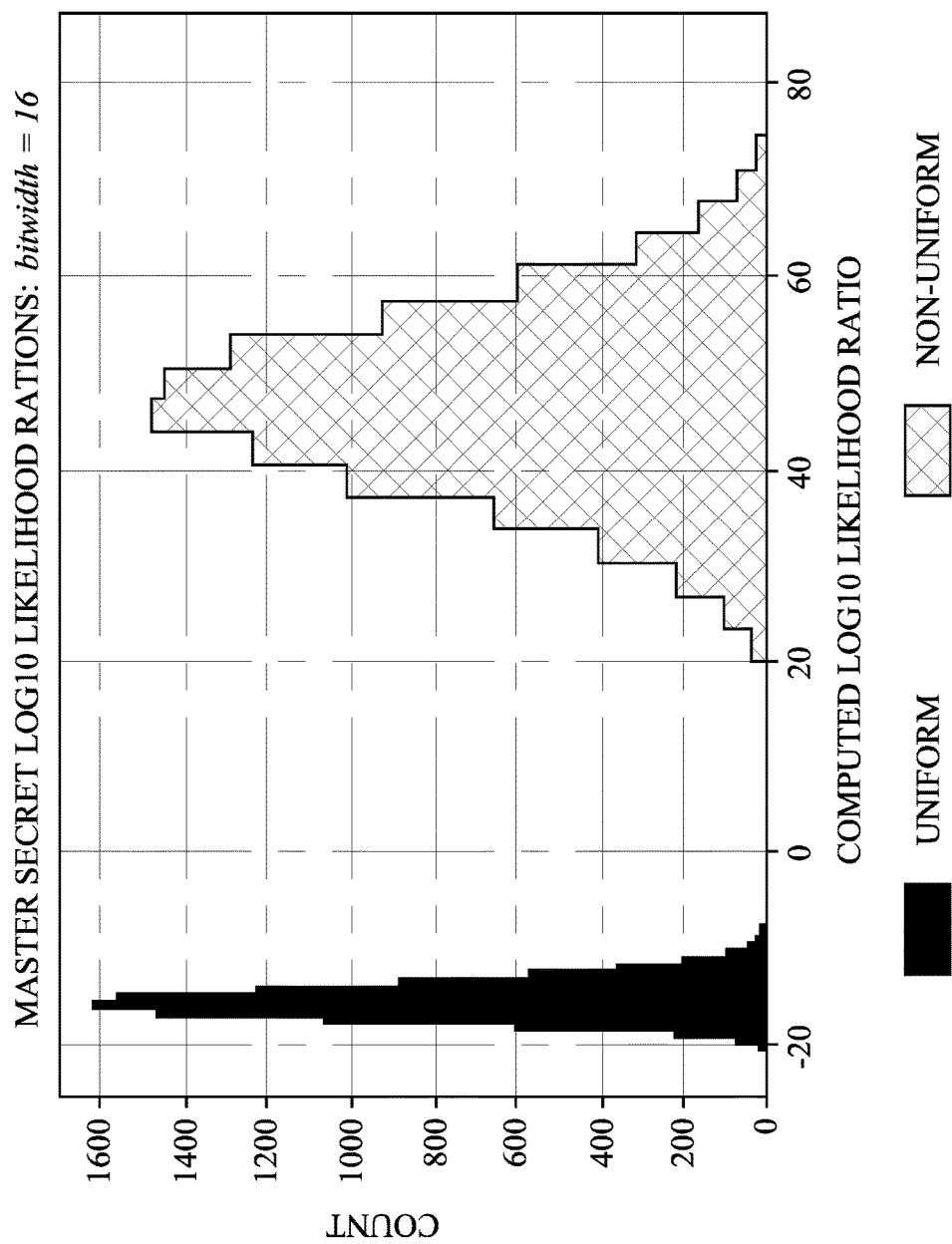
FIG. 7 illustrates an example plot of distributions representing the likelihood of a cryptographic key being in a given buffer.

In order for cryptographic key extractor 414 to apply the Neyman-Pearson test, the "normal memory" distribution of 16-bit blocks may be determined by building a histogram across the memory dump (e.g., the distribution of H0). During experimentation, the threshold for the key was set automatically for a given statistical power, which was chosen to be 0.995, although others may be selected in other implementations. That is, the threshold η was chosen such that if the 48-byte buffer is truly random, H0 is rejected in favor of H1 with probability 99.5%. A visualization of this can be seen in the plot 700 in FIG. 7, where the non-uniform distribution represents the distribution of Λ(x) when x is normal memory, and the red represents the distribution of Λ(x), when x is cryptographic key. In this case, the threshold η would be set such that roughly, log 10 η=−9. More specifically, FIG. 7 illustrates distributions for log 10 Λ(x), where x represents a 48-byte buffer that may or may not be a cryptographic key.

A Neyman-Pearson test was also performed on the "wings," which was defined after some experimentation to be 8-byte buffers flanking the putative cryptographic key. A separate Neyman-Pearson threshold ηw=1 was set for the wings, which means that the crossover point occurs when P(wing|H0)=P(wing|H1). As an implementation note, most of the probabilities were computed in log space for numerical stability.

Next, candidate keys can be filtered by computing a multinomial coefficient over the histogram of 2, 4, 8, and 16-bit block values in the 48-byte buffer, resulting in a large number of possible combinatorial outcomes. In the case of a 48-byte random buffer, this number is expected to be relatively high. If number is too low (e.g., below the 0.1% percentile assuming a random buffer), then the candidate can be rejected as a non-key.

In some embodiments, the 48-byte candidate keys may be filtered by cryptographic key extractor 414 using a "mini" Maurer test. The Maurer universal test for random bit generators essentially captures the Lempel-Ziv (LZ) compressibility of a buffer. Since normal memory is more likely to be more compressible than uniform random buffers, cryptographic keys will have a greater Maurer statistic than normal memory. Such filtering can be described using the following notation for a buffer x of length N=L(Q+K) bits, split up into L-bit blocks:

N=number of bits of input
L=memory length in bits (typical=8 or 16), aka block size
Q=initialization steps (recommended=10·2^L)
K=steps of the test (recommended=1000·2^L)

In this case, x can be treated as a 1-indexed array x[1], . . . , x[Q+K] of L-bit blocks. In turn, a "last-seen" table $A_n$ (v) can be created an maintained, which is defined as the distance between the current point in the buffer and the last time a block with the value v was seen, or n if v has never been seen. The first Q blocks are used to initialize the "last-seen" table $A_n$ (v). The Maurer test statistic is then defined as:

$$f(x) = \frac{1}{K} \sum_{n=Q+1}^{Q+K} \log_2 A_n(x[n])$$

Unfortunately, the Maurer computation requires far more data than is available in the 48-byte cryptographic key. Therefore, in some embodiments, a "mini" Maurer test may be employed whereby the first half (24 bytes) can be used to build the "last-seen" table, and then use the table to test the other half of the buffer (e.g., L=8, Q=24, K=24). The same can then be done in reverse and the two Maurer scores combined through averaging. Just as in the multinomial filter, if the "mini" Maurer statistic is too low (e.g., below the 0.1% percentile assuming a random buffer), then the candidate can be rejected as a non-key. This detects compressible patterns that the multinomial test may not catch, as the multinomial test is based solely on frequency, not sequence.

Finally, any hits can be sorted by their Neyman-Pearson on the 8-byte wings. The reason for sorting on the wings is that the 48-byte buffers have already been filtered to a set that could plausibly pass as cryptographic keys.

The combination of Neyman-Pearson likelihood ratio test for filtering and sorting, as well as filtering of non-random keys by the multinomial distribution and the Maurer "mini" test, returns a fairly reliable ranking of candidate keys. It should therefore be possible to try the cryptographic keys in order against the recorded network traces, to see if decryption succeeds.

To improve on efficiency, several techniques may also be employed, depending on the implementation. In some cases, cryptographic key extractor 414 may also use compressed data detection to look for compressed sections of memory in memory dump(s) 412 and skip those sections. In further cases, for libraries such as NSS, the cryptographic key is not guaranteed to be embedded in a predictable context. However, its pointer is guaranteed to be inside a predictable struct. Therefore, a further enhancement could be to search for the SECItem struct, read the pointer value, and then do a translation from the virtual address to a location in the memory dump. Yet another enhancement for detecting key material in memory could be to run across the entire memory, not looking for a specific size of key (48 bytes), but to label regions of memory as 'key' or 'non-key.' It is possible that variable order Markov models, also known as context trees, may be leveraged to do so. For example, a string of zeroes would tend to mark the abrupt end of a section of key (or compressed data).

With regard again to architecture 400 in FIG. 4, given cryptographic key 416 extracted from memory dump(s) 412 by cryptographic key extractor 414, a traffic decryptor 420 is able to decrypt all of the encrypted application traffic 418. In many cases, the extraction process conducted by monitoring process 410 and cryptographic key extractor 414 may generate a large number of cryptographic keys 416, with no information correlating the cryptographic key to the specific encrypted session of a given set of traffic 418. To make this correlation, traffic decryptor 420 may, in various embodiments, cycle through all cryptographic keys 416 until the appropriate message is decrypted:

For SSL 3.0-1.2: Finished
For TLS 1.3: the appropriate encrypted handshake message For TLS 1.3, entropy heuristics can also be used to defend against uncommon messages appearing early. In this case, the cryptographic key that generated the plaintext with the lowest entropy can be selected by traffic decryptor 420. This process is relatively efficient, i.e., analyzing thousands of possible cryptographic keys in seconds, and trivially parallelizable. The extracted plaintext can be stored in JSON, or as a packet capture that demonstrates the flow on the underlying application protocol.

In various embodiments, the resulting decrypted traffic 422 from traffic decryptor 420 can be used in architecture 400 to provide better ground truth for training process 249 that trains the machine learning-based traffic analysis process 248 (e.g., a traffic classifier), which can be deployed into a monitored network. In particular, decrypted traffic 422 will include the plaintext extracted from encrypted traffic 418, which can be used by training process 249 to label traffic associated with application 406 as benign or malicious. In doing so, traffic analysis process 248 can better distinguish between malicious and non-malicious encrypted (e.g., TLS) connections. Said differently, the techniques herein allow rules/signatures to be applied to the plaintext contained in the packet capture or JSON, greatly increasing the efficiency of determining ground truth.

Figure 8:
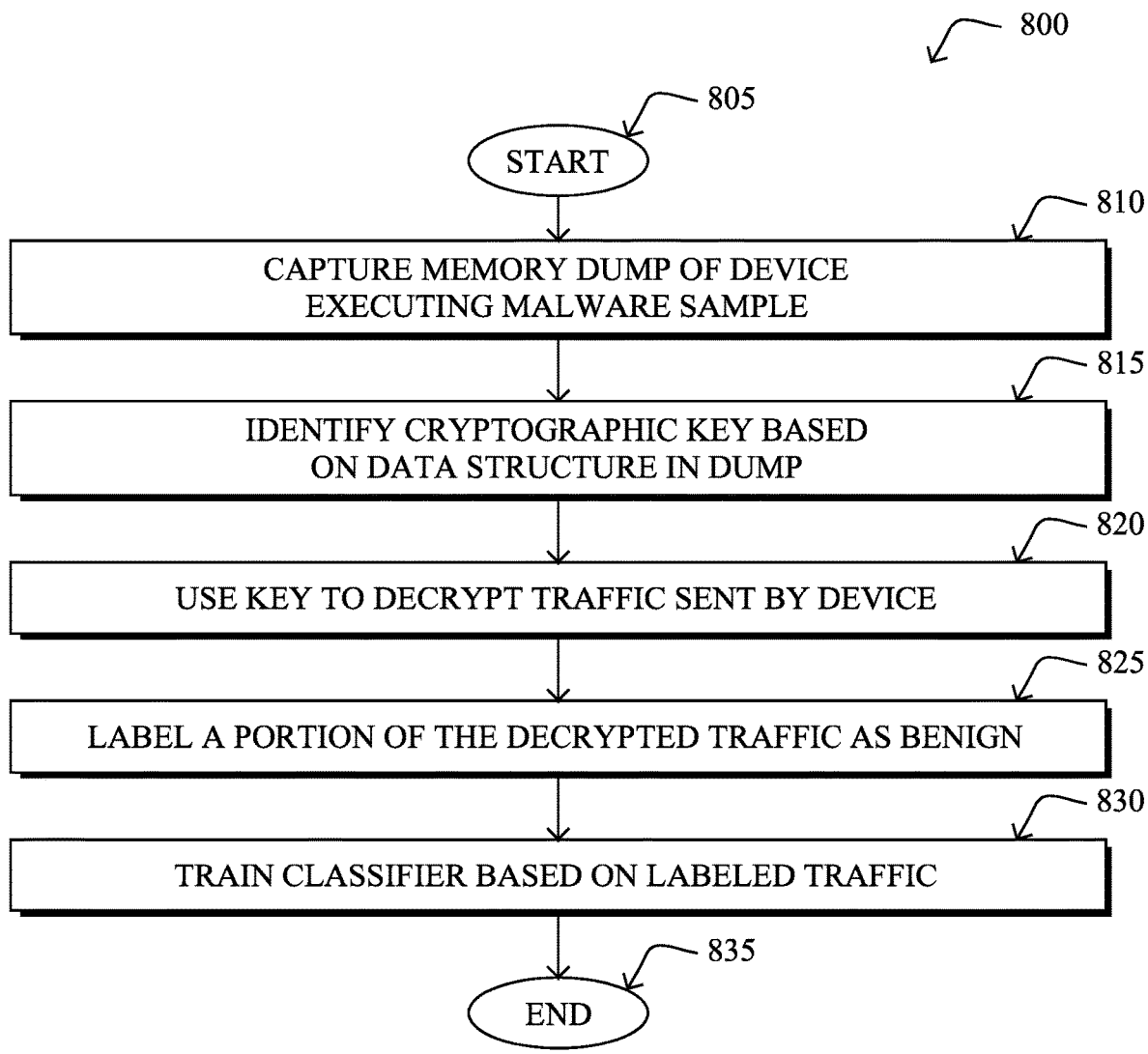
FIG. 8 illustrates an example simplified procedure for training a machine learning-based traffic analyzer.

FIG. 8 illustrates an example simplified procedure for training a machine learning-based traffic analyzer, in accordance with one or more embodiments described herein. For example, a non-generic, specifically configured device (e.g., device 200) may perform procedure 800 by executing stored instructions (e.g., by implementing architecture 400). The procedure 800 may start at step 805, and continues to step 810, where, as described in greater detail above, the device may capture a memory dump of a device in a sandbox environment executing a malware sample. In some cases, a complete dump of the memory can be captured. In other embodiments, the memory dump may be captured for a specific process (e.g., lsass.exe in the case of Schannel being used).

In various embodiments, trigger conditions can also be used to trigger when the capturing is to take place. For example, the trigger condition may be a Change Cipher Spec message appearing in the traffic of the device, multiple socket.send( ) calls to a particular 5-tuple being observed, detecting multiple calls to a particular application programming interface (API) of the device, or the like.

At step 815, as detailed above, the monitoring device may identify a cryptographic key based on a particular data structure in the captured memory dump. In many cases, the cryptographic key may be within a known data structure, according to the specific library in use by the sandbox device. However, in further cases, the data structure may instead include a pointer to the cryptographic key, as in the case of NSS.

At step 820, the monitoring device may use the identified cryptographic key to decrypt encrypted traffic sent by the sandbox device, as described in greater detail above. Notably, once the cryptographic key has been identified from the captured memory dump, the monitoring device may use the cryptographic key to derive the cryptographic information (e.g., keys, etc.) needed to decrypt any associated application traffic.

At step 825, as detailed above, the monitoring device may label at least a portion of the decrypted traffic sent by the device as benign. Notably, certain malware may leverage an existing application, such as a web browser, to communicate with a remote server via an encrypted traffic session. However, not all encrypted traffic from the web browser will thus be malicious, since there are also benign uses for encryption, as well.

At step 830, the monitoring device may train a machine learning-based traffic classifier based on the at least a portion of the decrypted traffic sent by the device and labeled as benign, as described in greater detail above. Notably, by distinguishing between benign encrypted traffic a malicious encrypted traffic in the training dataset (e.g., based on the captured plaintext from the decrypted traffic), the resulting traffic classifier can better distinguish between the two. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, can decrypt any encrypted (e.g., TLS, etc.) session from any application or library, i.e., it does not depend on malware using Schannel. In addition the techniques herein can be used to train a machine learning-based traffic analyzer with better curated malware data. Further, the techniques herein do not depend on man-in-the-middle or OS-level modifications, both of which malware can identify and possibly evade.

While there have been shown and described illustrative embodiments that provide for generating more accurate training data for a traffic classifier, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   capturing a memory dump of a device in a sandbox environment executing a malware sample;
   identifying a cryptographic key based on a particular data structure in the captured memory dump;
   using the identified cryptographic key to decrypt encrypted traffic sent by the device;
   labeling at least a portion of the decrypted traffic sent by the device as benign; and
   training a machine learning-based traffic classifier to classify encrypted traffic in a network as malicious or non-malicious based on the at least a portion of the decrypted traffic sent by the device and labeled as benign.

2. The method as in claim 1, further comprising:
   deploying the machine learning-based traffic classifier to a node in the network, to detect the presence of malware in the network.

3. The method as in claim 1, wherein the particular data structure comprises a wrapper for the cryptographic key, the method further comprising:
   identifying a particular encryption suite used by the device to encrypt the traffic; and
   identifying the data structure based on the identified encryption suite used by the device to encrypt the traffic.

4. The method as in claim 1, wherein capturing the memory dump of the device executing the malware sample comprises:
   detecting a triggering condition to initiate the memory dump.

5. The method as in claim 4, wherein the triggering condition to initiate the memory dump comprises one of: a Change Cipher Spec message appearing in the traffic of the device, multiple socket.send( ) calls to a particular 5-tuple being observed, detecting multiple calls to a particular application programming interface (API) of the device.

6. The method as in claim 1, wherein identifying the encryption key based on the particular data structure in the captured memory dump comprises:
   identifying a set of bytes in the memory dump having high entropy in comparison to bytes preceding or following the set of bytes in the memory dump.

7. The method as in claim 1, wherein the traffic sent by the device is encrypted using Transport Layer Security (TLS).

8. An apparatus, comprising:
   one or more network interfaces to communicate with a network;
   a processor coupled to the network interfaces and configured to execute one or more processes; and
   a memory configured to store a process executable by the processor, the process when executed configured to:
      capture a memory dump of a device in a sandbox environment executing a malware sample;
      identify a cryptographic key based on a particular data structure in the captured memory dump;
      use the identified cryptographic key to decrypt encrypted traffic sent by the device;
      label at least a portion of the decrypted traffic sent by the device as benign; and
      train a machine learning-based traffic classifier to classify encrypted traffic in the network as malicious or non-malicious based on the at least a portion of the decrypted traffic sent by the device and labeled as benign.

9. The apparatus as in claim 8, wherein the process when executed is further configured to:
deploy the machine learning-based traffic classifier to a node in the network, to detect the presence of malware in the network.

10. The apparatus as in claim 8, wherein the particular data structure comprises a wrapper for the cryptographic key, wherein the process when executed is further configured to:
identify a particular encryption suite used by the device to encrypt the traffic; and
identify the data structure based on the identified encryption suite used by the device to encrypt the traffic.

11. The apparatus as in claim 8, wherein the apparatus captures the memory dump of the device executing the malware sample by:
detecting a triggering condition to initiate the memory dump.

12. The apparatus as in claim 11, wherein the triggering condition to initiate the memory dump comprises one of: a Change Cipher Spec message appearing in the traffic of the device, multiple socket.send( ) calls to a particular 5-tuple being observed, detecting multiple calls to a particular application programming interface (API) of the device.

13. The apparatus as in claim 8, wherein the apparatus identifies the encryption key based on the particular data structure in the captured memory dump by:
identifying a set of bytes in the memory dump having high entropy in comparison to bytes preceding or following the set of bytes in the memory dump.

14. The apparatus as in claim 8, wherein the traffic sent by the device is encrypted using Transport Layer Security (TLS).

15. A tangible, non-transitory, computer-readable medium storing program instructions that cause a computing device to execute a process comprising:
capturing a memory dump of a device in a sandbox environment executing a malware sample;
identifying a cryptographic key based on a particular data structure in the captured memory dump;
using the identified cryptographic key to decrypt encrypted traffic sent by the device;
labeling at least a portion of the decrypted traffic sent by the device in the sandbox environment as benign; and
training a machine learning-based traffic classifier to classify encrypted traffic in a network as malicious or non-malicious based on the at least a portion of the decrypted traffic sent by the device in the sandbox environment and labeled as benign.

16. The computer-readable medium as in claim 15, wherein capturing the memory dump of the device executing the malware sample comprises:
detecting a triggering condition to initiate the memory dump.

17. The computer-readable medium as in claim 16, wherein the triggering condition to initiate the memory dump comprises one of: a Change Cipher Spec message appearing in the traffic of the device, multiple socket.send( ) calls to a particular 5-tuple being observed, detecting multiple calls to a particular application programming interface (API) of the device.

18. The computer-readable medium as in claim 16, wherein the traffic sent by the device is encrypted using Transport Layer Security (TLS).

19. The computer-readable medium as in claim 16, wherein the program instructions when executed is further configured to:
deploy the machine learning-based traffic classifier to a node in the network, to detect the presence of malware in the network.

20. The computer-readable medium as in claim 15, wherein the program instructions identify the encryption key based on the particular data structure in the captured memory dump by:
identifying a set of bytes in the memory dump having high entropy in comparison to bytes preceding or following the set of bytes in the memory dump.

* * * * *

UNITED STATES PATENT AND TRADEMARK OFFICE
CERTIFICATE OF CORRECTION

PATENT NO. : 11,196,546 B2
APPLICATION NO. : 16/701373
DATED : December 7, 2021
INVENTOR(S) : Blake Harrell Anderson Page 1 of 1

It is certified that error appears in the above-identified patent and that said Letters Patent is hereby corrected as shown below:

In the Specification

Column 15, Line 46, should read:
ProtocolVersion        version;/* which version was used */

Column 16, Line 25, should read:
The test's significance level, $\alpha$, is given by the probability Column 16, Line 26, should read:
$\alpha = P\ (\Lambda(X) \leq \eta | H0)$.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*